United States Patent [19]
Ando et al.

[11] Patent Number: 5,699,127
[45] Date of Patent: Dec. 16, 1997

[54] AUTOMATIC BRIGHTNESS LIMITER AUTOMATIC CONTROL CIRCUIT, CONTRAST LIMITER CONTROL CIRCUIT, LUMINANCE/COLOR DIFFERENCE SIGNAL PROCESSOR AND VIDEO DISPLAY APPARATUS

[75] Inventors: Hiroshi Ando, Ibaraki; Hiroki Kinugawa, Kusatsu; Masahiko Sasada, Takatsuki; Minoru Miyata, Suita, all of Japan

[73] Assignee: Matsushita Electric Industrial Co., Ltd., Osaka, Japan

[21] Appl. No.: 519,076

[22] Filed: Aug. 24, 1995

[30] Foreign Application Priority Data

Aug. 29, 1994 [JP] Japan .................. 6-203859

[51] Int. Cl.⁶ .................................... H04N 5/57
[52] U.S. Cl. ................ 348/678; 348/673; 348/687
[58] Field of Search ............................ 348/673, 678, 348/679, 677, 687, 525, 645; 315/411; H04N 5/57

[56] References Cited

U.S. PATENT DOCUMENTS

| | | | |
|---|---|---|---|
| 4,005,262 | 1/1977 | Fijisawa et al. | 348/673 |
| 4,044,375 | 8/1977 | Norman | 348/673 |
| 4,081,838 | 3/1978 | Wheeler | 358/167 |
| 4,137,552 | 1/1979 | Serafini | 358/203 |
| 4,253,110 | 2/1981 | Harwood et al. | 358/74 |
| 4,682,231 | 7/1987 | Yamakawa | 348/673 |
| 4,901,156 | 2/1990 | Yook | 348/687 |
| 4,968,106 | 11/1990 | Ikeuchi et al. | 315/611 |
| 4,982,287 | 1/1991 | Lagoni | 358/168 |
| 4,996,590 | 2/1991 | Okamoto et al. | 348/645 |
| 5,021,885 | 6/1991 | Kim | 348/673 |
| 5,200,829 | 4/1993 | Lagoni | 358/243 |
| 5,341,173 | 8/1994 | Hyeon | 348/525 |

FOREIGN PATENT DOCUMENTS

| | | | |
|---|---|---|---|
| 0 439 382 A1 | 7/1991 | European Pat. Off. | H04N 5/59 |
| 0 447 167 A2 | 9/1991 | European Pat. Off. | H04N 5/44 |
| 0 606 855 A1 | 7/1994 | European Pat. Off. | H04N 5/44 |
| 2-94882 | 4/1990 | Japan . | |
| 5056371 | 3/1993 | Japan | H04N 5/59 |
| 6054278 | 2/1994 | Japan | H04N 5/59 |
| 6303556 | 10/1994 | Japan | H04N 5/74 |
| 2 155 739 A | 9/1985 | United Kingdom | H04N 5/16 |

*Primary Examiner*—Glen B. Burgess
*Attorney, Agent, or Firm*—Ratner & Prestia

[57] ABSTRACT

The object of the present invention is to easily compensate automatic brightness limiting performance and automatic contrast limiting performance even if a picture is displayed with a different aspect ratio and to prevent deterioration of picture quality such as gradation and sharpness. A picture display apparatus includes (1) an automatic brightness limiter (ABL) circuit including a comparison circuit for varying an EHT compensation starting point, an ABL gain control circuit for varying a slope of the EHT characteristic versus the APL, an ABL comparison voltage generator, a DAC for adjusting an ABL compensation starting point and a DAC for adjusting an ABL gain and (2) an automatic contrast limiter (ACL) circuit including another comparison circuit for varying an EHT compensation starting point, an ACL gain control circuit for varying a slope of the EHT characteristic versus the APL, an ACL comparison voltage generator, a DAC for adjusting an ACL compensation starting point and a DAC for adjusting an ACL gain.

8 Claims, 4 Drawing Sheets m, n...ABL/ACL compensation starting point 5,699,127

AUTOMATIC BRIGHTNESS LIMITER AUTOMATIC CONTROL CIRCUIT, CONTRAST LIMITER CONTROL CIRCUIT, LUMINANCE/COLOR DIFFERENCE SIGNAL PROCESSOR AND VIDEO DISPLAY APPARATUS

BACKGROUND OF THE INVENTION

1. Field of the Invention

The present invention relates to a luminance signal adjusting circuit, especially to an improvement of an automatic brightness limiter (ABL) and an automatic contrast limiter (ACL) of a luminance signal adjusting circuit of a television receiver.

2. Description of the Prior Art

Recently, a high quality picture is desired in a television receiver and an ABL control circuit to automatically adjust a DC level of a luminance signal and an ACL control circuit to automatically adjust an amplitude of the luminance signal are included to compensate for the EHT (extra high tension) variation of the receiver. The variety of television receivers having display devices with a 16:9 aspect ratio and television receivers for a High Vision system indicates that the number of television receivers which can vary an aspect ratio of the displayed picture is increasing.

For an example of an ABL and ACL control circuit, for example Japanese Patent Laid Open Application 2-94882 is proposed.

A block diagram of an ABL and ACL control circuit responsive to an aspect ratio switching in accordance with the prior art is shown in FIG. 1.

Block 101 is an extra high tension (EHT) generator including a flyback transformer. Resistors 102, 103 and 104 are for converting an EHT current flowing from EHT generator 101 into an EHT detecting voltage. Block 105 is an aspect ratio detector. Block 106 is a switch switched by an output of the aspect ratio detector 105. Blocks 107 and 108 are buffers inputting an EHT detection voltage detected at resistors 102, 103 and 104. Block 109 is a brightness control voltage generator to generate a brightness control voltage. Block 110 is an adder to add the EHT detection voltage outputted from buffer 107 and the brightness control voltage outputted from brightness control voltage generator 109. Block 111 is a contrast control voltage generator to generate a contrast control voltage. Block 112, is an adder to add the EHT detection voltage outputted from buffer 108 and the contrast control voltage outputted from contrast control voltage generator 111. Block 113 is a luminance and color difference signal processor. Terminal 114 is a brightness control voltage input terminal to input an output voltage from adder 110. Terminal 115 is a contrast control voltage input terminal to input an output voltage from adder 112. Terminal 116 is a primary color signal output terminal to output a primary color signal in which brightness and contrast are adjusted by the voltages inputted to brightness control voltage input terminal 114 and contrast control voltage input terminal 115, respectively. Block 117 is a primary color signal output circuit to amplify a primary color signal outputted from primary color signal output terminal 116. Block 118 is a cathode ray tube (CRT) for displaying a picture (CRT). Block 119 is an anode of CRT 118 for supplying an EHT for electron beam acceleration from EHT generator 101.

Performance of the ABL control circuit and the ACL control circuit shown in FIG. 1 in accordance with the prior art is explained below, referring to FIG. 2.

The EHT detecting voltages corresponding to the same average picture level (APL) value are different when horizontally wide picture having an aspect ratio such as 16:9 as shown in FIG. 2(a) is displayed and when a picture having an aspect ratio such as 4:3 as shown in FIG. 2(b) is displayed even if the displayed pictures have the same picture information (i.e., content). In FIG. 2(b), the hatched areas at the right and left sides are areas where the electron beam is scanned but the phosphor does not emit light because the signal level is black. Therefore, even if FIG. 2(a) and FIG. 2(b) have the same picture information, the average value of the beam current at the displayed picture (b) of a 4:3 aspect ratio is smaller than that at the displayed picture (a) of a 16:9 aspect ratio and the slope of the EHT characteristic versus the APL value is lower.

That is, as for the EHT detecting voltage generated when the EHT current flowing from EHT generator 101 to anode 119 is converted to a voltage by resistors 102, 103 and 104, the slope of the EHT regulation characteristic versus the APL varies according to an aspect ratio as shown in FIG. 2(c). FIG. 2(c) illustrates the EHT regulation characteristics versus the APL (a) and (b) corresponding to a picture with a 16:9 aspect ratio shown in FIG. 2(a) and a picture with a 4:3 aspect ratio shown in FIG. 2(b), respectively. In FIGS. 2(c) and 2(d), the abscissa is APL value of a luminance signal and the ordinate is an EHT supplied to CRT, respectively.

Therefore, a difference occurs in the EHT current and another difference occurs in the effect of ABL and ACL circuits according to the difference between aspect ratios, even when the same picture information is displayed.

To prevent these differences, a switch 106 is provided across resistor 103 and switch 106 is switched by a control voltage from aspect ratio detector 105 that the EHT characteristic (a) versus the APL at a picture with a 16:9 aspect ratio approaches to the EHT characteristic (b) at a picture with a 4:3 aspect ratio.

FIG. 2(d) shows an EHT characteristic (a') compensated by switching the EHT detection voltage by a control voltage from aspect ratio detector 105. (Change from characteristic (a) to characteristic (a')).

According to the above configuration, the EHT, and therefore the EHT detection voltage, remain nearly the same (as shown in FIG. 2(d)) even if the aspect ratio changes from that shown in FIG. 2(a) to that shown in FIG. 2(b) and vice versa. The effects of ABL and ACL are nearly the same and the picture quality such as picture gradation and picture sharpness can be made nearly equal.

In the prior art configuration, however, the ABL and ACL characteristics are dominated by the values of resistors 102, 103 and 104.

Moreover, switch 106 for detecting the aspect ratio and short circuiting a resistor and buffers 107 and 108 and adders 110 and 112 for ABL and ACL, respectively are necessary. Thus, circuit scale is large.

SUMMARY OF THE INVENTION

In the present invention, optimum ABL and ACL characteristics are obtained even if the aspect ratio of the picture changes, by coupling the ABL and ACL circuits to one terminal and making the ABL and ACL starting points and the performance characteristics variable. The circuit configuration can be simple by switching with a bus bar data such as IIC (inter IC).

To solve the problems associated with the prior art, an ABL and ACL control circuit in accordance with the present invention includes a comparison circuit which can vary a compensation starting point and a gain control circuit which can vary a slope of the EHT characteristic versus the APL. The ABL and ACL characteristics can be optimized by controlling the adjustment of the ABL and ACL characteristics not with hardware, but with software.

That is, the ABL and ACL characteristics can be set independently and optimum performance can be obtained by setting their data separately even if a picture with a different aspect ratio is displayed.

DETAILED DESCRIPTION OF THE INVENTION

Figure 1:
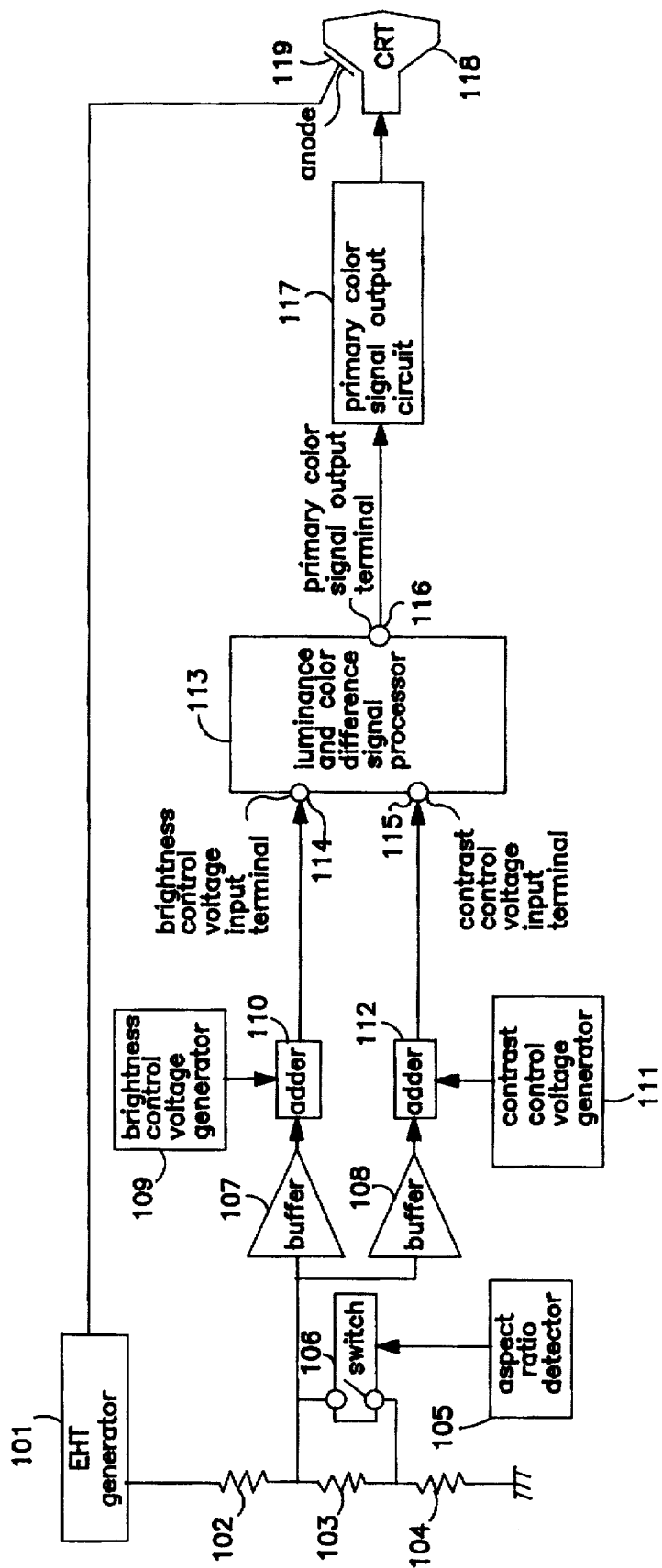
FIG. 1 is a block diagram of a principal part of a television receiver including an ABL and ACL control circuit in accordance with the prior art.
Figure 2A:
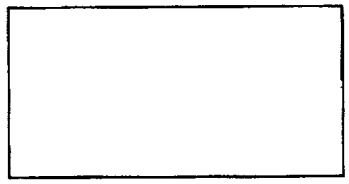
FIG. 2(a) shows a picture with a 16:9 aspect ratio displayed on a CRT with a 16:9 aspect ratio.
Figure 2B:
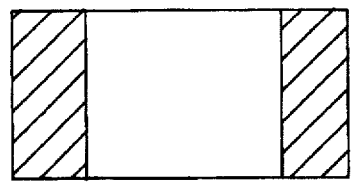
FIG. 2(b) shows a picture with a 4:3 aspect ratio displayed on a CRT with a 16:9 aspect ratio.
Figure 2C:
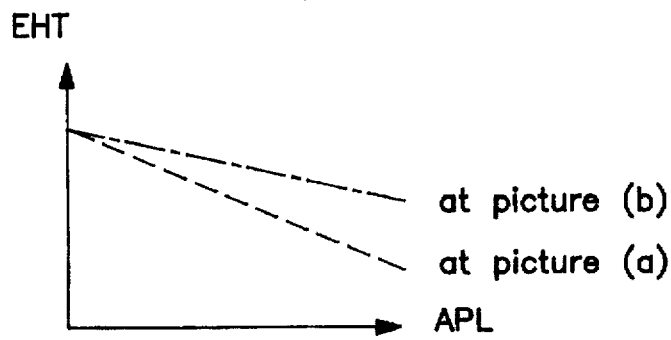
FIG. 2(c) is a graph of an EHT characteristic versus the APL.
Figure 2D:
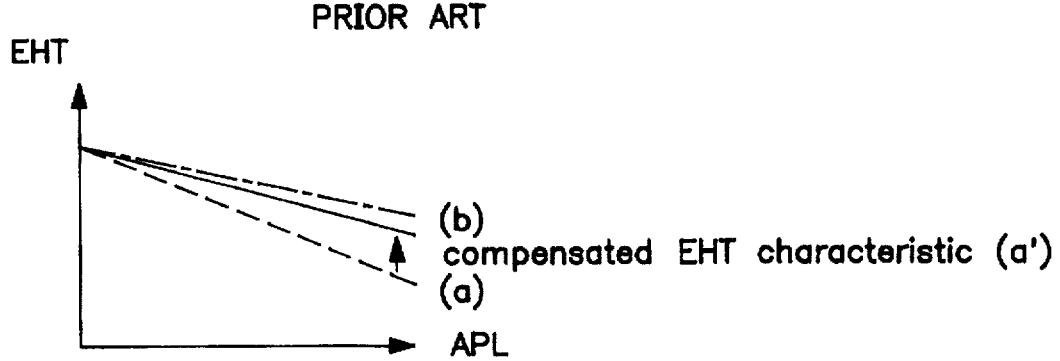
FIG. 2(d) is a graph of an EHT characteristic versus the APL of a circuit shown in FIG. 1 when switch 106 is switched, in accordance with the prior art.
Figure 3:
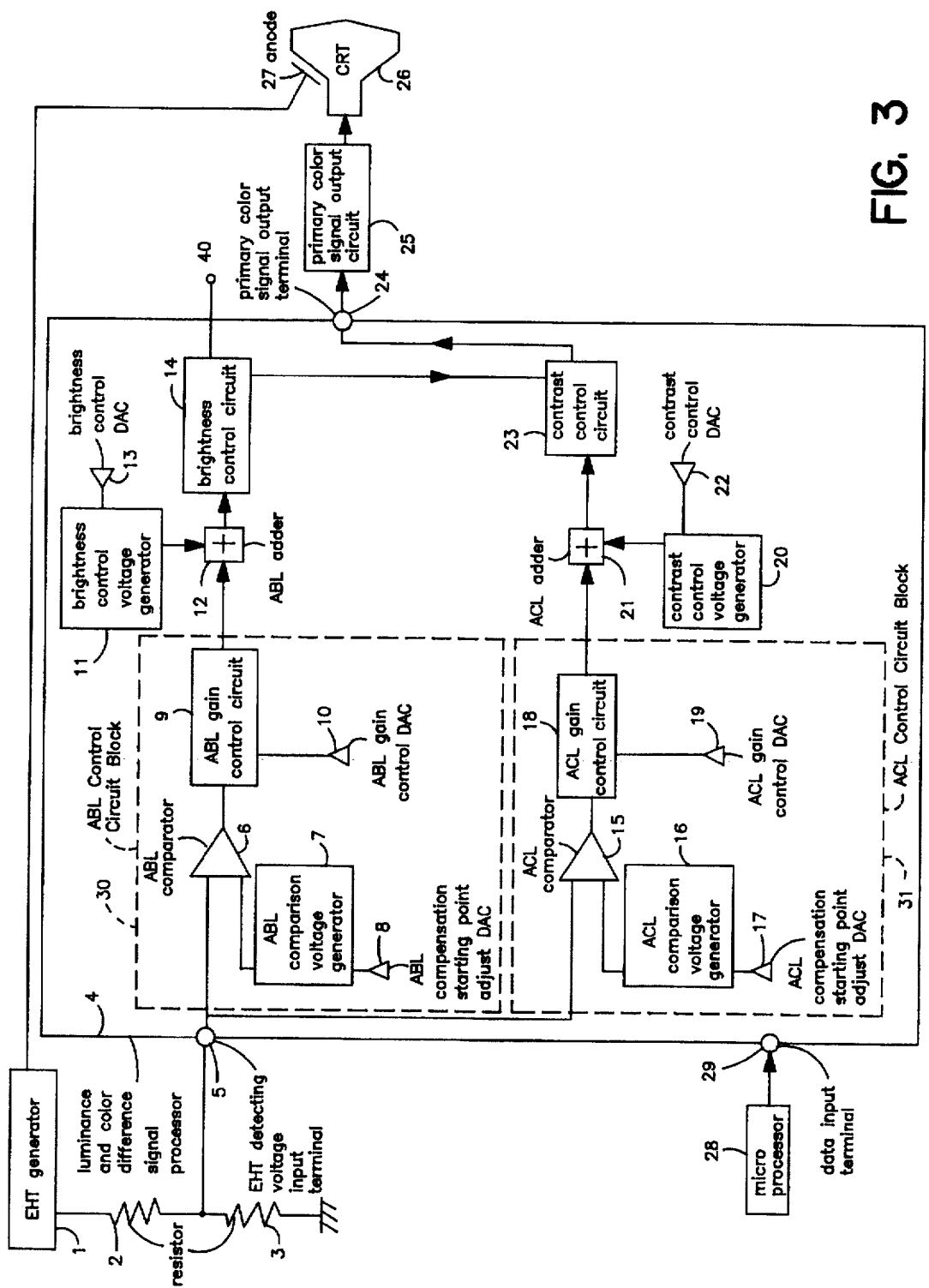
FIG. 3 is a block diagram of a principal part of a television receiver including an ABL and ACL control circuit in accordance with an exemplary embodiment of the present invention.

A block diagram of a principal part of a television receiver including an ABL and ACL control circuit in accordance with an exemplary embodiment of the present invention is shown in FIG. 3.

Block 1 is an EHT generator including a flyback transformer. Resistors 2 and 3 are for converting an EHT current flowing from EHT generator 1 into an EHT detecting voltage. Block 4 is a luminance and color difference signal processor. A luminance and a color difference signal is provided as an input to the luminance and color difference signal processor 4. The luminance and color difference signal processor 4 processes this signal and provides the processed signal to a primary color signal output circuit 25 which converts the luminance and color difference signal into primary color signals. Alternatively, the luminance and color difference signal processor 4 may provide primary color signals to the primary color signal output circuit 25 which then amplifies the signals. Terminal 5 is an EHT detecting voltage input terminal inputting an EHT detection voltage generated at resistor 3.

Block 6 is an ABL comparator for adjusting an ABL compensation starting point by comparing the input signal inputted at EHT detecting voltage input terminal 5 and a first reference voltage. Block 7 is an ABL comparison voltage generator for generating the first reference voltage to be supplied to ABL comparator 6 and to determine an ABL compensation starting point. Block 8 is a digital-to-analog converter (DAC) for controlling ABL comparison voltage generator 7. Block 9 is an ABL gain control circuit for controlling an ABL control characteristic and for inputting the output of ABL comparator 6. Block 10 is an ABL gain control DAC for controlling ABL gain control circuit 9. Block 11 is a brightness control voltage generator for generating a brightness control voltage. Block 12 is an adder for adding the ABL compensation voltage outputted from ABL gain control circuit 9 and the brightness control voltage outputted from brightness control voltage generator 11. Block 13 is a brightness control DAC for controlling brightness control voltage generator 11. Block 14 is a brightness control circuit for inputting the output voltage from adder 12. Block 30 represents an ABL control circuit block which includes the circuits concerning ABL.

Block 15 is an ACL comparator for adjusting an ACL compensation starting point by comparing the input signal inputted at the EHT detecting voltage input terminal 5 and a second reference voltage. Block 16 is an ACL comparison voltage generator for generating the second reference voltage to be supplied to ACL comparator 15 and to determine the ACL compensation starting point. Block 17 is a ACL compensation starting point adjust DAC for controlling ACL comparison voltage generator 16. Block 18 is an ACL gain control circuit for controlling an ACL control characteristic and for inputting the output of ACL comparator 15. Block 19 is an ACL gain control DAC for controlling ACL gain control circuit 18. Block 20 is a contrast control voltage generator for generating a contrast control voltage. Block 21 is an adder for adding the ACL compensation voltage outputted from ACL gain control circuit 18 and the contrast control voltage outputted from contrast control voltage generator 20. Block 22 is a contrast control DAC for controlling contrast control voltage generator 20. Block 23 is a contrast control circuit for inputting the output voltage from adder 21. Block 31 represents an ACL control circuit block which includes the circuits concerning ACL.

Terminal 40 is an input terminal for receiving the luminance and color difference signals. Terminal 24 is a primary color signal output terminal for outputting primary color signals in which the brightness and the contrast are adjusted by the voltages inputted at brightness control circuit 14 and contrast control circuit 23. Block 25 is a primary color signal output circuit for amplifying the primary color signals outputted from primary color signal output terminal 24. Block 26 is a CRT having an aspect ratio, for example 16:9. Terminal 27 is an anode through which an EHT for CRT 26 is supplied from EHT generator 1. Block 28 is a microprocessor for supplying data to DACs 8, 10, 13, 17, 19 and 22. Terminal 29 is a data input terminal for supplying data from micro-processor 28 to luminance and color difference signal processor 4.

The performance of a television receiver in accordance with an exemplary embodiment of the present invention is explained below.

Figure 4A:
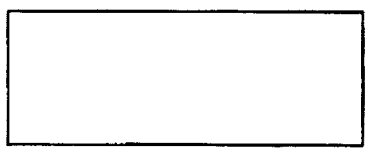
FIG. 4(a) shows a picture with a 16:9 aspect ratio displayed on a CRT with a 16:9 aspect ratio.
Figure 4B:
FIG. 4(b) shows a picture with a 4:3 aspect ratio displayed on a CRT with a 16:9 aspect ratio.

The value of the EHT current flowing in resistor 3 differs between the case in which a picture having a 16:9 aspect ratio is displayed on a screen having a 16:9 aspect ratio as shown in FIG. 4(a) and the case in which a picture having a 4:3 aspect ratio is displayed on the same screen having a 16:9 aspect ratio as shown in FIG. 4(b).

That is, the EHT detecting voltage converted from the EHT current flowing in resistors 2 and 3 varies according to the aspect ratio of the picture to be displayed even if the same picture information is displayed. The slopes of the EHT characteristics versus the APL are different as shown in FIG. 4(c).

Figure 4C:
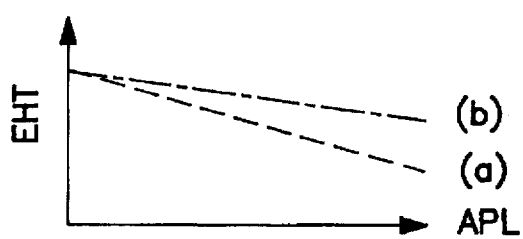
FIG. 4(c) is a graph of an EHT characteristic versus the APL (without compensation).

In FIG. 4(c), line (a) represents an EHT characteristic versus the APL when a picture having a 16:9 aspect ratio is displayed on a screen having a 16:9 aspect ratio as shown in FIG. 4(a) and line (b) represents an EHT characteristic versus the APL when a picture having a 4:3 aspect ratio is displayed on the same screen having a 16:9 aspect ratio as shown in FIG. 4(b). Therefore, the EHT current differs according to the difference between the aspect ratios and a difference occurs in the ABL and ACL performance even if the displayed pictures have the same information (i.e., content).

To solve this problem, ABL control circuit block 36 and ACL control circuit block 31 are used. The ABL or ACL compensation starting point and the slope of the EHT characteristic versus the APL are set separately according to the aspect ratio. The degree of control by the ABL or ACL is almost independent of the aspect ratio.

When a bright signal having a high APL value is inputted, the beam current is large and the EHT decreases. The decreasing of the EHT is detected at resistor 3. The detected EHT value Vin is compared with a reference voltage Vref generated at ABL comparison voltage generator 7 at ABL comparator 6.

When Vin is smaller than Vref, the difference voltage, dV=Vref−Vin is outputted from ABL comparator 6. The input voltage dV is gain adjusted at ABL gain control circuit 9. The gain controlled dV is added to a brightness control voltage outputted from brightness control voltage generator 11 at adder 12. Brightness control circuit 14 lowers the picture brightness according to the output of adder 12. Then, the beam current of CRT 26 decreases and EHT generator 1 works to raise the EHT and to prevent EHT decreasing. This corresponds to the right side region of the ABL compensation starting point (m) shown in FIG. 4(d).

When a dark signal having a low APL value is inputted, the EHT does not decrease as much as when a bright signal is inputted. Because the EHT holds a comparatively high voltage, Vin is larger than Vref, there is no output at ABL comparator 6 and the EHT is not compensated. That is, the EHT characteristic versus the APL is the same as the characteristic (a). This corresponds to the left side region of the ABL compensation starting point (m) shown in FIG. 4(d).

The ACL performance is quite similar to that of the ABL performance and its explanation is omitted.

Figure 4D:
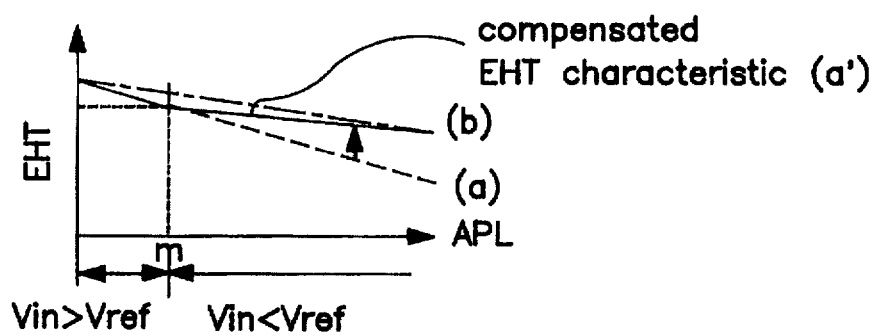
FIG. 4(d) is a graph of a compensated EHT characteristic of a circuit shown in FIG. 3.
Figure 4E:
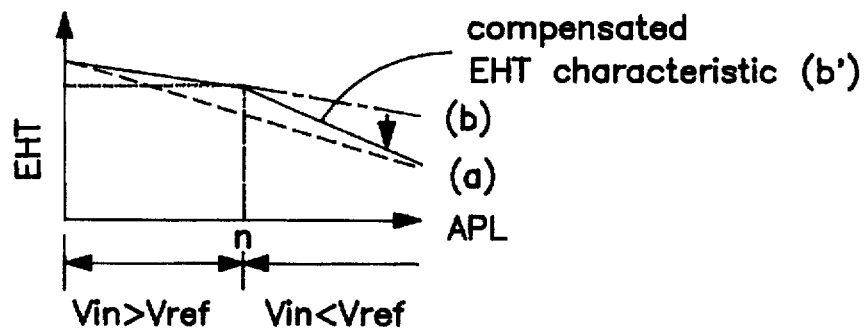
FIG. 4(e) is a graph of another compensated EHT characteristic of a circuit shown in FIG. 3.

FIG. 4(d) and 4(e) show EHT characteristics versus APL for ABL or ACL in the above-mentioned exemplary embodiment.

FIG. 4(d) shows an example in which the EHT characteristic for ABL or ACL is varied so that the EHT characteristic (a) approaches the EHT characteristic (b) and results in a compensated EHT characteristic (a').

FIG. 4(e) shows another example in which the EHT characteristic for ABL or ACL is varied so that the EHT characteristic (b) approaches the EHT characteristic (a) and results in a compensated EHT characteristic (b').

Thus, a television receiver in accordance with the present invention can have nearly same EHT characteristics both for a display having a 16:9 aspect ratio shown in FIG. 4(a) and for a display having a 4:3 aspect ratio shown in FIG. 4(b) by varying the compensation starting point and the slope of the EHT characteristic for ABL or ACL.

Therefore, nearly the same picture quality such as picture gradation and sharpness can be obtained for the displays having different aspect ratios. The compensation starting point and the slope of the EHT characteristic for ABL or ACL are freely variable by inputting data in micro processor 28.

Thus, the present invention features providing a comparison circuit which can vary the compensation starting point a gain control circuit which can vary the slope of the EHT characteristic versus the APL. Optimum ABL and ACL performance can be obtained even for different aspect ratios by setting each data in microprocessor 28 and without adjusting hardware for ABL and ACL voltages. Therefore, the circuit configuration becomes simpler. Both ABL control circuit 30 and ACL control circuit 31 are not always necessary and either one may be used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An automatic brightness limiter control circuit comprising:

automatic brightness limiter compensation starting point determining means for comparing a detected extra high tension value Vin, representing an average extra high tension value over at least one video field interval, to a reference voltage Vref to provide an output signal which is zero when Vin is larger than Vref which is a difference voltage, when Vin is smaller than Vref; and automatic brightness limiter gain control means for providing an automatic brightness limiter control signal to be applied to an input video signal, the automatic brightness limiter gain control means including means for receiving a brightness control voltage and means responsive to the output signal of said automatic brightness limiter compensation starting point determining means for varying the level of said automatic brightness limiter control signal to control the extra high tension value.

2. An automatic contrast limiter control circuit comprising:

automatic contrast limiter compensation starting point determining means for comparing a detected extra high tension value Vin, representing an average extra high tension value over at least one video field interval, to a reference voltage Vref to provide an output signal which is zero when Vin is larger than Vref which is a difference voltage, when Vin is smaller than Vref; and automatic contrast limiter gain control means for providing an automatic contrast limiter control signal to be applied to an input video signal, the automatic contrast limiter gain control means including means for receiving a contrast control voltage and means responsive to the output signal of said automatic contrast limiter compensation starting point determining means for varying the level of said automatic contrast limiter control signal to control the extra high tension value.

3. A luminance/color difference signal processor comprising:

(1) an automatic brightness limiter control circuit comprising:

automatic brightness limiter compensation starting point determining means for comparing a detected extra high tension value Vin with a reference voltage Vref and outputting zero when Vin is larger than Vref and outputting a difference voltage (Vin−Vref) when Vin is smaller than Vref; and automatic brightness limiter gain control means for inputting the output of said automatic brightness limiter compensation starting point determining means and varying the level of said output; and (2) brightness control means for inputting the output of said automatic brightness limiter control circuit and a brightness control voltage and controlling a DC level of a luminance signal;

wherein the slope of the extra high tension characteristic versus the average picture level can be varied for average picture level values larger than the automatic brightness limiter compensation starting point, that is Vin=Vref.

4. A luminance/color difference signal processor comprising:

(1) an automatic contrast limiter control circuit comprising:

automatic contrast limiter compensation starting point determining means for comparing a detected extra high tension value Vin with a reference voltage Vref and outputting zero when Vin is larger than Vref and outputting a difference voltage (Vin−Vref) when Vin is smaller than Vref; and automatic contrast limiter gain control means for inputting the output of said automatic contrast limiter compensation starting point determining means and varying the level of said output; and (2) contrast control means for inputting the output of said automatic contrast limiter control circuit and a contrast control voltage and controlling an amplitude of a luminance signal;

wherein the slope of extra high tension characteristic versus the average picture level can be varied for the average picture level values larger than the automatic contrast limiter compensation starting point, that is Vin=Vref.

5. A luminance/color difference signal processor comprising:

(1) an automatic brightness limiter control circuit comprising:

automatic brightness limiter compensation starting point determining means for comparing a detected extra high tension value Vin with a reference voltage Vref and outputting zero when Vin is larger than Vref and outputting a difference voltage (Vin−Vref) when Vin is smaller than Vref; and automatic brightness limiter gain control means for inputting the output of said automatic brightness limiter compensation starting point determining means and varying the level of said output; and (2) brightness control means for inputting the output of said automatic brightness limiter control circuit and a brightness control voltage and controlling a DC level of a luminance signal;

(3) an automatic contrast limiter control circuit comprising:

automatic contrast limiter compensation starting point determining means for comparing the detected extra high tension value Vin with the reference voltage Vref and outputting zero when Vin is larger than Vref and outputting a difference voltage (Vin−Vref) when Vin is smaller than Vref; and automatic contrast limiter gain control means for inputting the output of said automatic contrast limiter compensation starting point determining means and varying the level of said output; and (4) a contrast control means for inputting the output of said automatic contrast limiter control circuit and a contrast control voltage and controlling an amplitude of a luminance signal;

wherein the slope of the extra high tension characteristic versus the average picture level can be varied for the average picture level values larger than automatic brightness limiter/automatic contrast limiter compensation starting point Vin=Vref.

6. A video display apparatus comprising:

(1) a luminance/color difference signal processor comprising:

(1.1) an automatic brightness limiter control circuit comprising:

automatic brightness limiter compensation starting point determining means for comparing a detected extra high tension value Vin with a reference voltage Vref and outputting zero when Vin is larger than Vref and outputting a difference voltage (Vin−Vref) when Vin is smaller than Vref; and automatic brightness limiter gain control means for inputting the output of said automatic brightness limiter compensation starting point determining means and varying the level of said output; and (1.2) brightness control means for inputting an output of said automatic brightness limiter control circuit and a brightness control voltage and controlling a DC level of a luminance signal;

wherein the slope of the extra high tension characteristic versus the average picture level can be varied for the average picture level values larger than the automatic brightness limiter compensation starting point Vin=Vref; and (2) primary color signal output means for producing primary, color signals from a luminance signal and color difference signals outputted from said luminance/color difference signal processor; and (3) a display device driven by the output of said primary color signal output means for displaying a picture.

7. A luminance/color difference signal processor comprising:

(1) a luminance/color difference signal processor comprising:

(1.1) an automatic contrast limiter control circuit comprising:

automatic contrast limiter compensation starting point determining means for comparing a detected extra high tension value Vin with a reference voltage Vref and outputting zero when Vin is larger than Vref and outputting a difference voltage (Vin−Vref) when Vin is smaller than Vref; and automatic contrast limiter gain control means for inputting the output of said automatic contrast limiter compensation starting point determining means and varying the level of said output; and (1.2) contrast control means for inputting the output of said automatic contrast limiter control circuit and a contrast control voltage and controlling an amplitude of a luminance signal;

wherein the slope of the extra high tension characteristic versus the average picture level can be varied for the average picture level values larger than the automatic contrast limiter compensation starting point Vin=Vref; and (2) primary color signal output means for producing primary color signals from a luminance signal and color difference signals outputted from said luminance/color difference signal processor; and (3) a display device driven by the output of said primary color signal output means for displaying a picture.

8. A video display apparatus comprising:

(1) a luminance/color difference signal processor comprising:

(1.1) automatic brightness limiter control circuit comprising:

automatic brightness limiter compensation starting point determining means for comparing a detected extra high tension value Vin with a reference voltage Vref and outputting zero when Vin is larger than Vref and outputting a difference voltage (Vin−Vref) when Vin is smaller than Vref; and automatic brightness limiter gain control means for inputting the output of said automatic brightness limiter compensation starting point determining means and varying the level of said output; and (1.2) brightness control means for inputting the output of said automatic brightness limiter control circuit and a brightness control voltage and controlling a DC level of a luminance signal;

(1.3) an automatic contrast limiter control circuit comprising:

automatic contrast limiter compensation starting point determining means for comparing the detected extra high tension value Vin with the reference voltage Vref and outputting zero when Vin is larger than Vref and outputting a difference voltage (Vin−Vref) when Vin is smaller than Vref; and automatic contrast limiter gain control means for inputting the output of said automatic contrast limiter compensation starting point determining means and varying the level of said output; and (1.4) contrast control means for inputting the output of said automatic contrast limiter control circuit and a contrast control voltage and controlling an amplitude of a luminance signal;

wherein the slope of the extra high tension characteristic versus the average picture level can be varied for the average picture level values larger than automatic brightness limiter/automatic contrast limiter compensation starting point Vin=Vref.

(2) primary color signal output means for producing primary color signals from a luminance signal and color difference signals outputted from said luminance/color difference signal processor; and (3) a display device driven by the output of said primary color signal output means for displaying a picture.

* * * * *

UNITED STATES PATENT AND TRADEMARK OFFICE
CERTIFICATE OF CORRECTION

PATENT NO. : 5,699,127
DATED : December 16, 1997
INVENTOR(S) : Ando et al

It is certified that error appears in the above-identified patent and that said Letters Patent is hereby corrected as shown below:

On the title page: Item [54] and Column 1, line 5.
delete "AUTOMATIC BRIGHTNESS LIMITER AUTOMATIC CONTROL CIRCUIT, CONTRAST LIMITER CONTROL CIRCUIT, LUMINANCE/COLOR DIFFERENCE SIGNAL PROCESSOR AND VIDEO DISPLAY APPARATUS" and insert --AUTOMATIC BRIGHTNESS LIMITER CONTROL CIRCUIT, AUTOMATIC CONTRAST LIMITER CONTROL CIRCUIT, LUMINANCE/COLOR DIFFERENCE SIGNAL PROCESSOR AND VIDEO DISPLAY APPARATUS--.

Column 8, line 44, after "primary" delete the comma ",".

Column 10, line 24, delete the period "," and insert a semicolon --;--.

Signed and Sealed this

Twenty-sixth Day of May, 1998

Attest:

BRUCE LEHMAN

*Attesting Officer*   *Commissioner of Patents and Trademarks*